US011831677B2

(12) United States Patent
Luo et al.

(10) Patent No.: US 11,831,677 B2
(45) Date of Patent: *Nov. 28, 2023

(54) DHCP-COMMUNICATIONS MONITORING BY A NETWORK CONTROLLER IN SOFTWARE DEFINED NETWORK ENVIRONMENTS

(71) Applicant: VMware, Inc., Palo Alto, CA (US)

(72) Inventors: Ye Luo, Beijing (CN); Qi Wu, Beijing (CN); Donghai Han, Beijing (CN)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/057,601

(22) Filed: Nov. 21, 2022

(65) Prior Publication Data

US 2023/0089533 A1    Mar. 23, 2023

Related U.S. Application Data

(63) Continuation of application No. 16/442,841, filed on Jun. 17, 2019, now Pat. No. 11,509,686.

(51) Int. Cl.
*H04L 9/40* (2022.01)
*G06F 9/455* (2018.01)
*H04L 61/5014* (2022.01)
*H04L 61/5076* (2022.01)

(52) U.S. Cl.
CPC ...... *H04L 63/1466* (2013.01); *G06F 9/45558* (2013.01); *H04L 61/5014* (2022.05);
(Continued)

(58) Field of Classification Search
CPC . H04L 63/1446; H04L 63/20; H04L 61/5014; H04L 61/5076; G06F 9/45558; G06F 2009/45595
See application file for complete search history.

(56) References Cited

U.S. PATENT DOCUMENTS

| 8,055,800 | B1 | 11/2011 | Bardzil et al. |
| 9,582,308 | B2 | 2/2017 | Masurekar et al. |

(Continued)

FOREIGN PATENT DOCUMENTS

KR    20170014853 A    2/2017

OTHER PUBLICATIONS

Chiba et al., "A Survey of Intrusion Detection Systems for Cloud Computing Environment", Intenrational Conference on Engineering & MIS, Sep. 2016, IEEE Publishing.*

(Continued)

*Primary Examiner* — Todd L Barker
(74) *Attorney, Agent, or Firm* — Barta, Jones & Foley, PLLC

(57) ABSTRACT

Methods and apparatus to manage a dynamic deployment environment including one or more virtual machines is provided herein. A disclosed example includes involves: scanning, by executing a computer readable instruction with a processor, the virtual machines in the deployment environment to identify a service installed on any of the virtual machines; determining, by executing a computer readable instruction with the processor, the identified service corresponds to a service monitoring rule; determining, by executing a computer readable instruction with the processor, that a monitoring agent identified by the service monitoring rule is installed on the one or more virtual machines on which the service is installed; and configuring the monitoring agent, by executing a computer readable instruction with the processor, to monitor the service in accordance with the service monitoring rule on the at least one of the virtual machines on which the service is installed.

20 Claims, 4 Drawing Sheets

(52) U.S. Cl.
CPC .......... *H04L 61/5076* (2022.05); *H04L 63/20* (2013.01); *G06F 2009/45595* (2013.01)

(56) References Cited

U.S. PATENT DOCUMENTS

| | | | |
|---|---|---|---|
| 9,736,185 | B1 | 8/2017 | Belamaric et al. |
| 10,348,767 | B1* | 7/2019 | Lee ............... H04L 63/0236 |
| 2002/0198881 | A1 | 12/2002 | Banerjee |
| 2007/0133576 | A1 | 6/2007 | Tsuge et al. |
| 2014/0130044 | A1 | 5/2014 | Zhang et al. |
| 2014/0280898 | A1 | 9/2014 | Voit et al. |
| 2015/0281274 | A1* | 10/2015 | Masurekar .......... H04L 63/1466 726/22 |
| 2016/0065601 | A1 | 3/2016 | Gong et al. |
| 2017/0026387 | A1 | 1/2017 | Vissamsetty et al. |
| 2018/0302439 | A1 | 10/2018 | Hoffman |
| 2018/0357422 | A1* | 12/2018 | Telang ................. G06F 21/577 |
| 2019/0149515 | A1 | 5/2019 | Sharma et al. |
| 2019/0297097 | A1 | 9/2019 | Gong et al. |

OTHER PUBLICATIONS

Elazim et al., "Software Defined Networking:Attacks and Countermeasures", 13th International Conference on Computer Engineering and Systems (ICCES), Dec. 18, 2018.*

Bishop et al., "Defending Cyberspace with Software Defined Networks", Journal of Information Warfare, vol. 14, No. 2, Apr. 2015, pp. 94-103.

Cox et al., "Leveraging SON to Improve the Security of DHCP", Proceedings of the 2016 ACM International Workshop on Security in Software Defined Networks and Network Function Virtualization, Mar. 2016, pp. 35-38.

Cox et al., "Leveraging SDN for ARP Security", SoutheastCon 2016, Norfolk, VA, USA, Apr. 2016, 8 pages.

Elazim et al., "Software Defined Networking: Attacks and Countermeasures", 13th International Conference on Computer Engineering and Systems (ICCES), Cairo, Egypt, IEEE, Dec. 2018, pp. 555-567.

Wang et al., "An SDN-based defensive solution against DHCP attacks in the virtualization environment", 2017 IEEE Conference on Dependable and Secure Computing, Taipei, Taiwan, Aug. 7, 2017, pp. 529-530.

Willems et al., "A Distributed Virtual Laboratory Architecture for Cybersecurity Traiing", 6th International Conference on Internet Technology and Secured Transactions, Dec. 11-14, 2011, Abu Dhabi, UAE, 8 pages.

* cited by examiner

DHCP-COMMUNICATIONS MONITORING BY A NETWORK CONTROLLER IN SOFTWARE DEFINED NETWORK ENVIRONMENTS

CROSS-REFERENCE TO RELATED APPLICATIONS

This application is a continuation of U.S. patent application Ser. No. 16/442,841, entitled "DHCP-COMMUNICATIONS MONITORING BY A NETWORK CONTROLLER IN SOFTWARE DEFINED NETWORK ENVIRONMENTS" filed Jun. 17, 2019, which claims benefit under 35 U.S.C. 119(a)-(d) to Foreign Application No. PCT/CN2019/086764 filed in China entitled "DHCP-COMMUNICATIONS MONITORING BY A NETWORK CONTROLLER IN SOFTWARE DEFINED NETWORK ENVIRONMENTS", on May 14, 2019, each of which is herein incorporated in its entirety by reference for all purposes.

BACKGROUND

The Dynamic Host Configuration Protocol ("DHCP") provides an important service to traditional physical networks and virtualized networks. For example, it automatically provides configuration information to hosts implemented in the networks. It may, for example, automatically provide dynamic and reusable network addresses to entities instantiated in the network. Examples of such entities include virtual machines ("VMs").

VMs are virtualized computing instances and may be equipped with their own resources. The VMs may be assigned their own workloads and may be configured to perform the tasks assigned to the workloads. The VMs may be partially configured by users and tenants. For example, a user may assign a static IP address to an interface of a VM. However, if a user configures an IP address on the interface that should have been assigned a dynamic IP address provided by a DHCP service, then the two IP addresses may be in conflict, and subsequently, the VM may become unreachable or compromised.

Furthermore, if a user manually assigns to a VM a particular IP address that otherwise belongs to a pool of dynamic IP addresses maintained by a DHCP service, then the assignment may cause problems. For example, if the DHCP service attempts to assign the particular IP address to another VM, then the two VMs would try to use the same IP address.

Problems may also occur when a user maliciously assigns an illegal IP address (i.e., an address that is not assigned by a DHCP server and is configured by a user without a permission) to a VM and intends to use that address to compromise the VM and intercept, using another VM, the packets intended to the compromised VM. This may result in a security breach of the VMs and the entire network.

Therefore, controlling the assignments of IP addresses to network components needs to be meticulously managed to avoid assignments that are unauthorized and unsupervised.

SUMMARY

In an embodiment, an approach for monitoring, by a network controller, DHCP communications exchanged in software defined network ("SDN") environments is presented. The approach allows the network controller, such as an SDN central controller, to snoop the DHCP communications that are transmitted to and from virtualized compute instances, such as VMs and containers, and protect the virtualized compute instances from being compromised.

In an embodiment, to initiate the monitoring of DHCP communications transmitted to and from a VM or a container, an SDN controller relies on notifications and messages received from datapath processes implemented in transport nodes and edge nodes.

Upon detecting that a new VM, or a new container, has been instantiated on a host and assigned a virtual network interface ("VNIC") and a port, an SDN controller may send instructions to a port manager managing the ports to set a BLOCK-EXCEPT-DHCP status on the port. The port manager may be a software-based module executing on a hypervisor of the host that supports the VM. The port manager may be executing in a virtual switch implemented in the hypervisor.

Setting the BLOCK-EXCEPT-DHCP status on the port allows the port to pass through only DHCP-related traffic and block any other traffic. The port manager may be configured to differentiate between the DHCP traffic and the non-DHCP traffic by inspecting, for example, a UDP header of the packets and determining that the packet belongs to the DHCP traffic if the packet includes "67" and "68" (where "67" is for a DHCP client, and "68" is for a DHCP server) as a port identifier in the UDP headers. Hence, even if a malicious user manually configures an unauthorized IP address on an interface of the VM, the traffic that uses that IP address, but that is not DHCP traffic, cannot go through the port and, thus, it will be dropped.

Once the BLOCK-EXCEPT-DHCP status is set on the port, a DHCP client application executing on the VM interacts with a DHCP service to obtain an IP address for the port of the VM.

In an embodiment, the datapath processes monitor all DHCP messages, and report them to the SDN controller. Upon receiving, from the datapath processes, a notification that an IP address has been assigned to the port of the VM, the SDN controller causes the port manager to overwrite the BLOCK-EXCEPT-DHCP status on the port assigned to the VNIC of the VM and set a NORMAL status on the port. This will allow the port to start accepting all traffic and configuration data, including both DHCP traffic and non-DHCP traffic.

Furthermore, the SDN controller may generate a SpoofGuard policy for the port of the VM and transmit the SpoofGuard policy and a SpoofGuard agent to the port manager. The SpoofGuard policy may be specific to the IP address that the DHCP server assigned to the VNIC of the VM.

In an embodiment, a SpoofGuard agent implements a SpoofGuard policy to determine whether the IP address that the VM is using is a legitimate IP address. The SpoofGuard agent may be implemented in a forwarding element of a hypervisor, or in a port manager implemented in a virtual switch of the hypervisor and may be configured to manage the ports of the VM. Examples of SpoofGuards are described in U.S. Pat. No. 9,582,308, entitled "Autodetecting Legitimate IP Addresses Using SpoofGuard Agents."

If the SpoofGuard agent detects that the VM started using an IP address that is different than the IP address that the particular DHCP server assigned to the port of the VM, then the SpoofGuard, or the port manager, may notify the SDN controller that the VM started using an unauthorized IP address. Subsequently, the controller may, for example, request setting the port to the initial BLOCK-EXCEPT-DHCP status and force the VM to request a new IP address from the DHCP server or drop the traffic. The SpoofGuard may also alter that IP address to the IP address that the DHCP server assigned to the VM. If the DHCP server triggers a lease expire event, then the controller, which monitors such events, causes the VM to receive a DHCP NACK message from a DHCP server. The controller may instruct the port manager to set a BLOCK-EXCEPT-DHCP status on the port and force the VM to request and obtain a new IP address, install a SpoofGuard again, and so forth.

DETAILED DESCRIPTION

In the following description, for the purposes of explanation, numerous specific details are set forth in order to provide a thorough understanding of the method described herein. It will be apparent, however, that the present approach may be practiced without these specific details. In some instances, well-known structures and devices are shown in a block diagram form to avoid unnecessarily obscuring the present approach.

1. Example Physical Implementations

Figure 1:
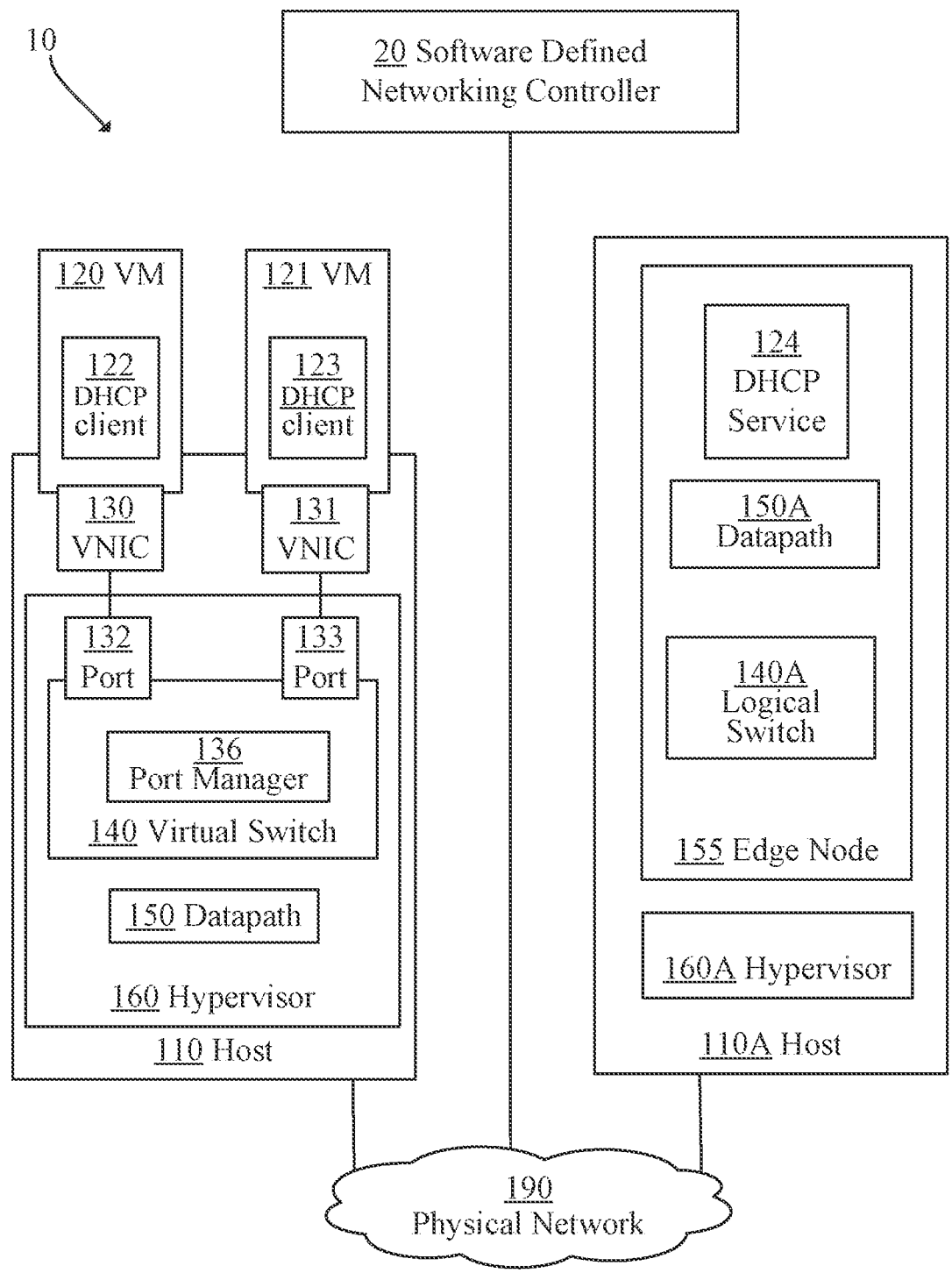
FIG. 1 is a block diagram depicting an example physical implementation view of an example logical network environment for DHCP-communications monitoring by a network controller in software defined networks.

FIG. 1 is a block diagram depicting an example physical implementation view of an example logical network environment for DHCP-communications monitoring by a network controller in software defined networks. In the depicted example, environment 10 includes an SDN controller 20, one or more hosts 110 and 110A, and a physical network 190.

SDN controller 20 is a software application which, when executed, is used to receive configuration files and instructions from a management plane (not shown) and use the received data to control entities configured in the network. While SDN controller 20 is shown as a single application, it should be recognized that it may be implemented with a cluster of controller servers or VMs, or in a distributed fashion.

In an embodiment, SDN controller 20 enables an DHCP snooping mode. The snooping mode allows a datapath process to intercept packets and report the information about the intercepted packets to SDN controller 20. SDN controller 20 parses the information to determine the packets' attributes. The datapath process may intercept, for example, the DHCP discovery requests, offers, IP address requests, and acknowledgments, and monitor the usage of IP addresses assigned to VMs.

Host 110/110A may be any type of computing device configured to receive, process and transmit data. Host 110/110A may include a hypervisor 160/160A, hardware components and other components (not shown). Hardware components may include hardware processors, memory units, data storage units, and physical network interfaces.

Hypervisor 160/160A may be implemented as a software layer that supports execution of multiple virtualized computing instances of VMs. Hypervisor 160/160A may use uplinks (not shown) to provide connectivity to and from physical network 190. Hypervisor 160 may include a virtual switch 140 and may provide connectivity to and from one or more virtual machines, including VMs 120 and 121.

In an embodiment, hypervisor 160 executes a datapath process 150. Datapath process 150 is usually executed on a CPU to implement operations that support environment 10. It may be used to determine the instruction classes and formats, design datapath components and interconnections for the instruction classes or formats and determine the datapath segments.

In an embodiment, host 160A implements an edge node 155. Edge node 155 is a virtualized network component that may be configured to provide various services, such as edge security and gateway services to VMs and hosts. It may be implemented as a separate physical server, or as a virtual machine, as shown in FIG. 1, supported by hypervisor 160A. Edge node 155, in addition to providing logical router and/or service gateway services, and may provide dynamic routing services, firewall services, NAT services, DHCP services, site-to-site VPN services, L2 VPN services, load balancing services, and the like. In an embodiment, edge node 155 may provide a DHCP service 124 and may work in conjunction with datapath process 150A.

Virtual switch 140/140A may be configured to monitor and manage data traffic that is communicated to and from hypervisor 160/160A, respectively. Implementations of virtual switch 140/140A may vary and may depend on a type of product in which the switch is deployed as a virtualization medium. For example, virtual switch 140 may be implemented as part of hypervisor 160, while virtual switch 140A may be implemented as part of edge node 155.

In an embodiment, virtual switch 140 implements a port manger 136, which is described in detail later.

VMs 120 and 121 may be realized as complete computational environments. VMs 120 and 121 may operate as virtual equivalents of hardware and software components of the physical computing systems. Physical resources of host 110 are allocated to VMs 120 and 121 and may be mapped to virtual resources such as virtual CPUs, virtual memory, virtual disks, virtual network interface controllers and the like, which are available to guest operating systems and software applications executing within the VMs. VMs 120 and 121 may connect to virtual switch 140 via virtual network interfaces (VNICs) 130 and 131, respectively, and via virtual switch ports 132 and 133, respectively.

In an embodiment, VM 120/121 executes an DHCP client 122/123. DHCP client 122/123 may be a software implemented module configured to use the DHCP functionalities to obtain configuration parameters such as IP addresses for VM 120 and 121. According to standard DHCP protocol, a DHCP client generates and broadcasts to a DHCP discovery message. In response, the DHCP client receives a unicast DHCP offer. Then, the DHCP client generates and transmits an DHCP request to a selected DHCP service. In response, the DHCP client receives an DHCP acknowledgment with a dynamic IP address. It is also possible to provide a local DHCP proxy at the hypervisor, as described in U.S. Pat. No. 9,548,965 invented by Hua Wang, et al., which is incorporated herein by reference in its entirety.

Physical network 190 may include local area networks and/or wide area networks and may utilize various hardware and software configurations. For example, physical network 190 may include one or more routers (not shown), one or more switches (not shown), and one or more switch ports (not shown).

2. DHCP-Communications Snooping by a Network Controller

In an embodiment, DHCP-communications monitoring is performed by SDN controller 20. To monitor ("snoop") the DHCP-related communications, SDN controller 20 receives notifications from datapath 150 and/or datapath 150A. Datapath 150 is executed on transport host 110, while datapath 150A is executed on edge transport node 155. The datapaths intercept DHCP request, offers, and acknowledgments exchanged between DHCP client 122 and DHCP service 124, and report the intercepted messages to SDN controller 20.

2.1. Setting a Block-Except-DHCP Status on a Port

Figure 2:
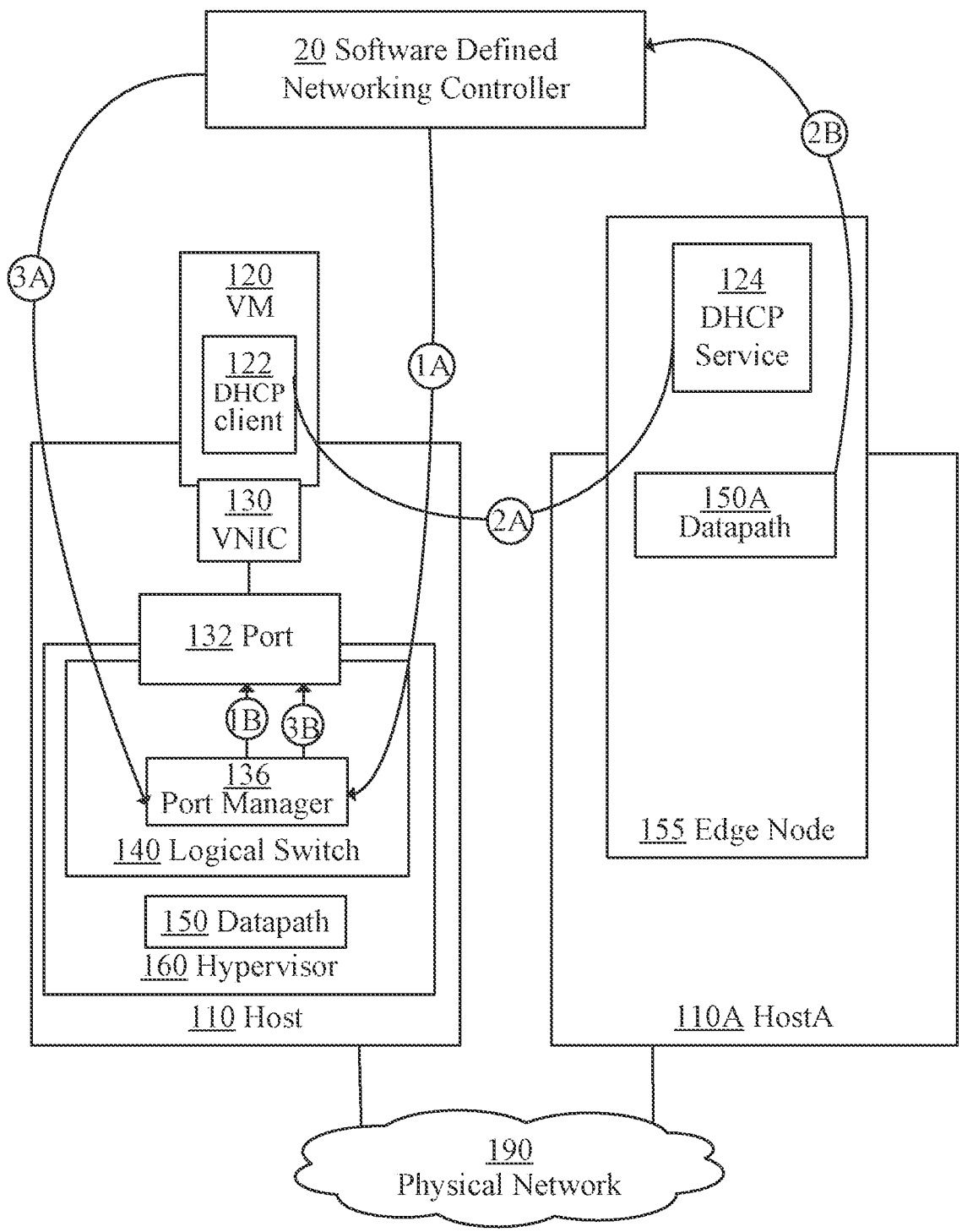
FIG. 2 is a block diagram depicting an example process for DHCP-communications monitoring by a network controller in software defined networks.
Figure 3:
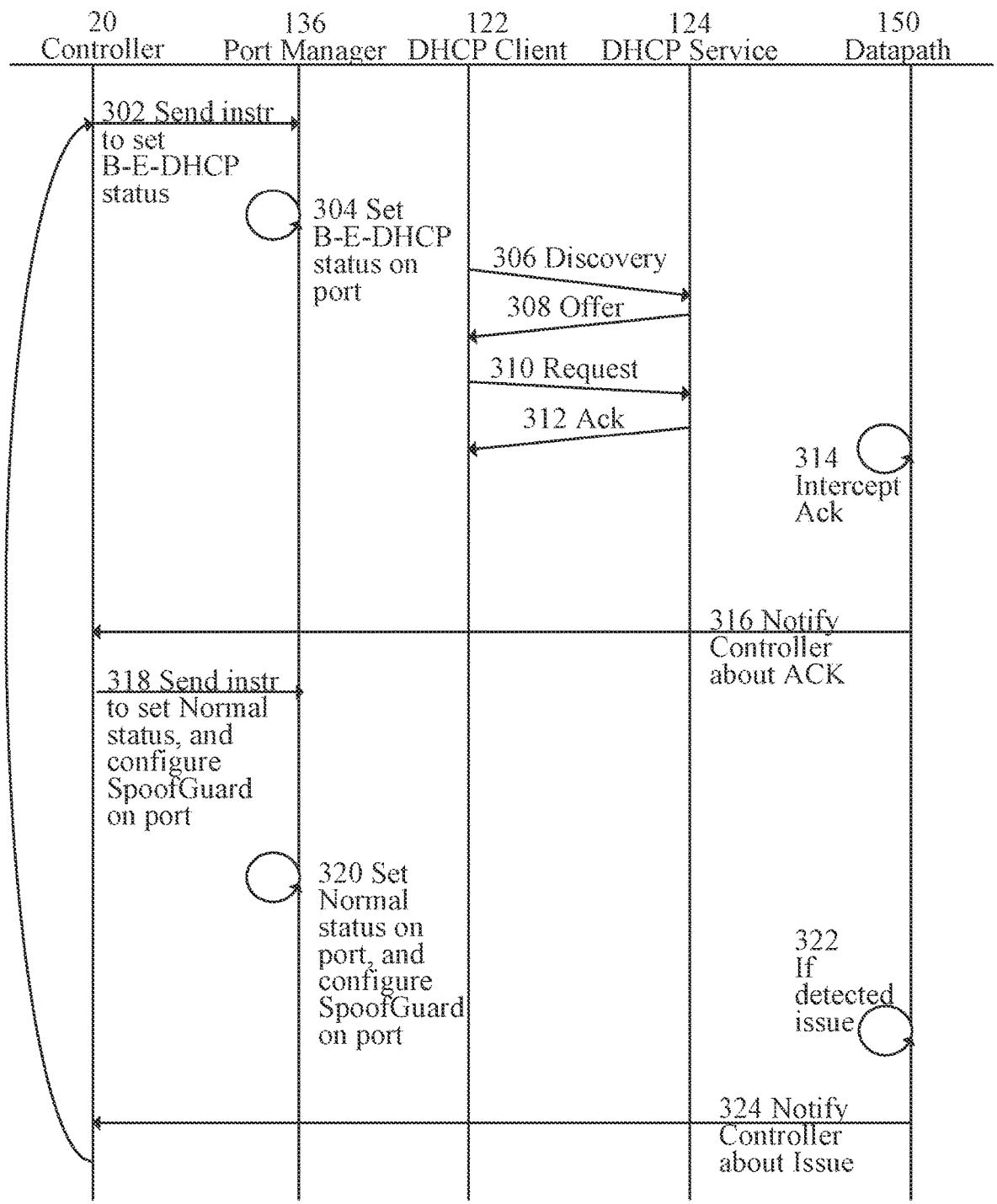
FIG. 3 is a time chart depicting an example process for DHCP-communications monitoring by a network controller in software defined networks.
Figure 4:
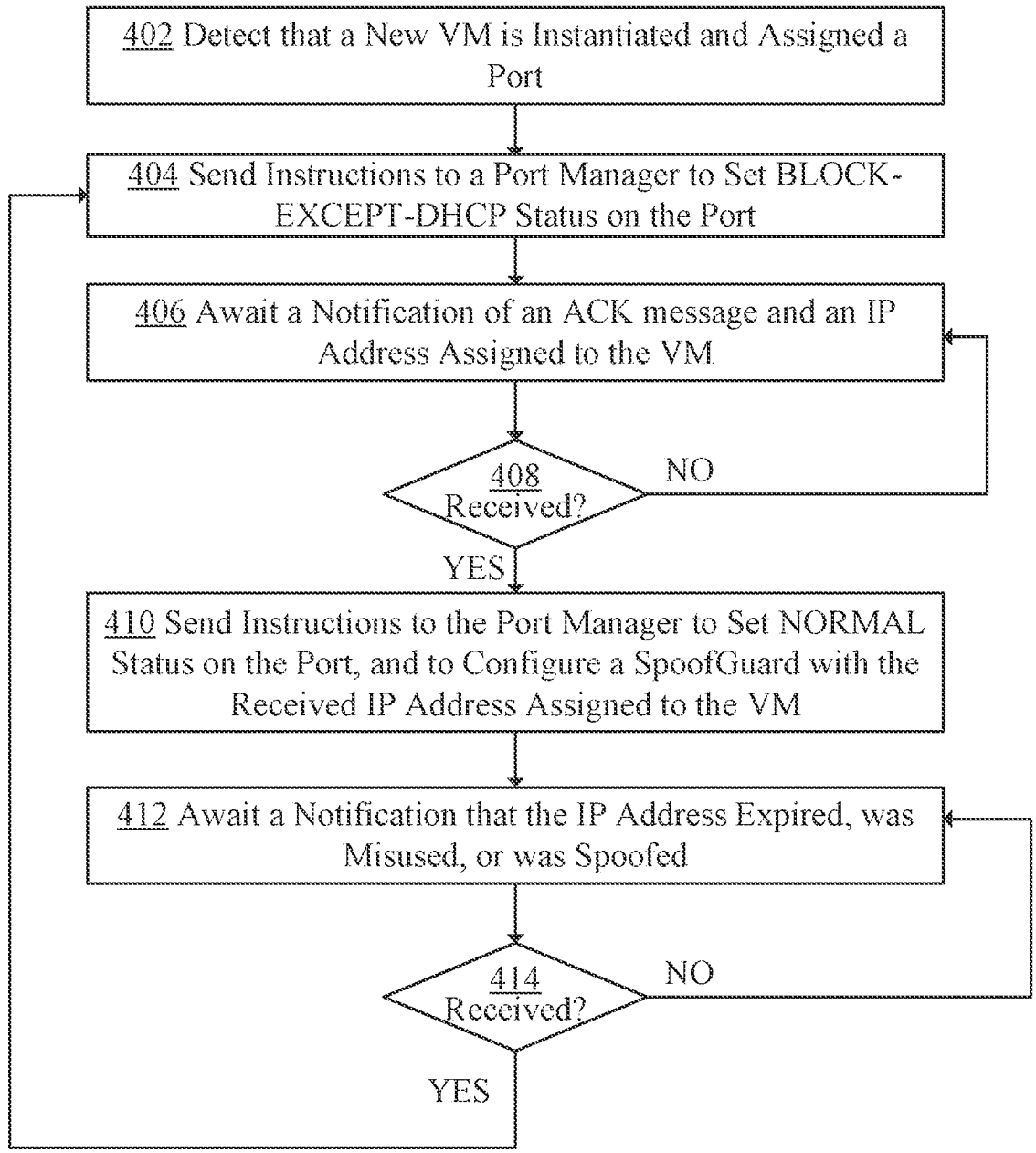
FIG. 4 is a flow chart depicting an example process for DHCP-communications monitoring by a network controller in software defined networks.

FIG. 2 is a block diagram depicting an example process for DHCP-communications monitoring by a network controller in software defined networks; FIG. 3 is a time chart depicting an example process for DHCP-communications monitoring by a network controller in software defined networks; and FIG. 4 is a flow chart depicting an example process for DHCP-communications monitoring by a network controller in software defined networks. The process pertains to assigning an IP address to VM 120, and is explained in reference to SDN controller 20, port manager 136, DHCP client 122, DHCP service 124 and datapath 150.

As shown in FIG. 4, in step 402, SDN controller 20 detects that VM 120 is instantiated on host computer 110 and assigned port 132.

In step 404, SDN controller 20 generates and sends instructions (step 1A in FIG. 2 and step 302 in FIG. 3) to port manager 136 executing in hypervisor 160 of host computer 110. The instructions may include a request to set a BLOCK-EXCEPT-DHCP status on port 132 assigned to VM 120. As shown in FIG. 3, SDN controller 20 sends (step 302 in FIG. 3) the instructions with the request to port manager 136.

Setting (step 1B in FIG. 2 and step 304 in FIG. 3) a BLOCK-EXCEPT-DHCP status on port 132 causes port manager 136 to filter the traffic received on port 132 and passing through only the DHCP-related traffic.

In step 406, SDN controller 20 awaits a notification that DHCP service 124 transmitted a DHCP acknowledgement and an IP address to VM 120. The notification may be sent to SDN controller 20 by datapath process 150.

The notification may be sent once DHCP client 122 and DHCP service 124 successfully exchange (step 2A of FIG. 2 and steps 306-312 in FIG. 3), a discovery request, an offer, a request, and an acknowledgment, and once datapath 150A intercepts (step 314 in FIG. 3) and notifies (step 2B in FIG. 2 and step 316 in FIG. 3) that the acknowledgment was sent to DHCP client 122.

SDN controller 20 may parse the notification received from DHCP service 124, determine whether the notification includes the DHCP acknowledgment, and if it does, parse the DHCP acknowledgment to identify an IP address that has been assigned to VM 120.

If, in step 408, SDN controller 20 determines that the notification has been received, then SDN controller 20 proceeds to step 410. Otherwise, SDN controller 20 continues awaiting the notification.

2.2. Setting a Normal Status on a Port

In step 410, SDN controller 20 generates and transmits (step 3A in FIG. 2 and step 318 in FIG. 3) instructions for port manager 136 to set a NORMAL status on port 132. By setting (step 3B in FIG. 2 and step 320 in FIG. 3) the NORMAL status on port 132, port manager 136 overwrites the previously set BLOCK-EXCEPT-DHCP status. Furthermore, by setting the NORMAL status on port 132, port manager 136 enables port 132 to accept all traffic, not just the DHCP-related traffic.

2.3. Installing a Spoofguard

In step 410, SDN controller 20 also generates, and transmits to port manager 136, a SpoofGuard with the IP address that has been assigned to VM 120. A SpoofGuard is a tool that is designed to prevent VMs from sending traffic with the source IP addresses that are not authorized to the VMs. The SpoofGuard can be configured at the port manager or the switch level and may help preventing malicious attacks such as web spoofing and phishing. For example, the SpoofGuard may be configured to detect whether an IP address that VM 120 is using matches the IP address that has been assigned to port 132. If it does not, then the SpoofGuard may prevent VM 120 from accessing any other VM or device in environment 10.

2.4. Snooping

In step 412, SDN controller 20 awaits a notification from datapath 150 (steps 322 and 324 in FIG. 3) that the IP address assigned to VM 120 has expired, or that the IP address assigned to VM 120 has been misused, or that the IP address assigned to VM 120 has been spoofed. An IP address lease expiration is usually triggered by DHCP service 124 internally. For example: if VM 120 is shutting down, then VM 120 does not need the IP address until VM 120 recovers. One way for DHCP service 124 to detect that VM 120 is shutting down is to monitor receiving an IP address RENEW request to renew the IP address assigned to VM 120. If DHCP service 124 does not receive such a request during a certain time period, then DHCP service 124 may assume that VM 120 does not need the IP address, and conclude that VM 120 is shutting down.

If any notification of the lease expiration, misuse or spoofing is received in step 414, then SDN controller 20 proceeds to step 404; otherwise, SDN controller 20 keeps awaiting such a notification. Meanwhile, SDN controller 20 may perform the above process for another VM or device.

The above process may be repeated for each newly instantiated VM and/or each time SDN controller 20 receives an indication that any of the IP addresses assigned to VMs has been spoofed or misused.

2.5. Preventing Spoofing on a Virtual Switch

In an embodiment, after synchronizing with an infrastructure management server (such as VMware vCenter®) (not shown) SDN controller 20 collects the IP addresses of all guest VMs that are provided by in-guest agents executing on the VMs. However, SDN controller 20 is configured not to trust the IP address provided by the VMs. Therefore, SDN controller 20 relies on the SpoofGuards executing on the hypervisor to determine whether any of the IP addresses provided by the VM-tools executing on the VMs has been compromised. If a VM has been compromised, then the IP address that the VM-tools executing on the VM provided to SDN controller 20 can be spoofed, and thus malicious transmissions can bypass the firewall policies.

In an embodiment, a SpoofGuard allows authorizing the IP addresses reported by VM-based tools and alter them if necessary to prevent spoofing. The SpoofGuard inherently trusts the MAC addresses of VMs as those are collected from primary configuration files and vSphere software development kit; however, it does snoop the usage of IP addresses by the VMs.

3. Improvements Provided by Certain Embodiments

In an embodiment, an approach for DHCP-communications snooping by a network controller in SDN environments provides mechanisms for automatic network access control. It allows detecting and preventing conflicts in IP address assignments that might be caused by misconfiguration of interfaces of virtualized compute instances, such as VMs and containers. Furthermore, the approach allows improving network security and detection of IP address misuse. Moreover, the approach allows detecting attempts to compromise the VMs and containers and traffic security virtual networks.

4. Implementation Mechanisms

The present approach may be implemented using a computing system comprising one or more processors and memory. The one or more processors and memory may be provided by one or more hardware machines. A hardware machine includes a communications bus or other communication mechanisms for addressing main memory and for transferring data between and among the various components of hardware machine. The hardware machine also includes one or more processors coupled with the bus for processing information. The processor may be a microprocessor, a system on a chip (SoC), or other type of hardware processor.

Main memory may be a random-access memory (RAM) or other dynamic storage device. It may be coupled to a communications bus and used for storing information and software instructions to be executed by a processor. Main memory may also be used for storing temporary variables or other intermediate information during execution of software instructions to be executed by one or more processors.

5. General Considerations

Although some of various drawings may illustrate a number of logical stages in a particular order, stages that are not order dependent may be reordered and other stages may be combined or broken out. While some reordering or other groupings may be specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described regarding specific embodiments. However, the illustrative embodiments above are not intended to be exhaustive or to limit the scope of the claims to the precise forms disclosed. Many modifications and variations are possible in view of the above teachings. The embodiments were chosen to best explain the principles underlying the claims and their practical applications, to thereby enable others skilled in the art to best use the embodiments with various modifications as are suited to the uses contemplated.

Any definitions set forth herein for terms contained in the claims may govern the meaning of such terms as used in the claims. No limitation, element, property, feature, advantage or attribute that is not expressly recited in a claim should limit the scope of the claim in any way. The specification and drawings are to be regarded in an illustrative rather than a restrictive sense.

What is claimed is:

1. A computer-implemented method for DHCP-communications monitoring by a network controller, the method comprising:

detecting that a virtualized compute instance is instantiated on a host computer;

determining an IP address that has been assigned to a port of the virtualized compute instance;

transmitting a SpoofGaurd with the IP address to a port manager;

in response to the transmitting, receiving an indication that the IP address assigned to the port of the virtualized compute instance has been misused, expired or spoofed; and in response to determining that the IP address assigned to the port of the virtualized compute instance has been misused, expired or spoofed, transmitting, to the port manager, instructions to set a BLOCK-EXCEPT-DHCP status on the port assigned to the virtualized compute instance.

2. The computer-implemented method of claim 1, wherein setting the BLOCK-EXCEPT-DHCP status on the port causes the port manager of the port to block any traffic to and from the port except DHCP-related traffic.

3. The computer-implemented method of claim 1, further comprising: determining the IP address has been assigned to the port of the virtualized compute instance by a DHCP service.

4. The computer-implemented method of claim 3, wherein determining, the IP address has been assigned to the port of the virtualized compute instance by the DHCP service includes receiving, from the DHCP service or a datapath process, an indication that the IP address has been assigned to the port of the virtualized compute instance by the DHCP service and the IP address that has been assigned.

5. The computer-implemented method of claim 3, further comprising transmitting, by a DHCP client executing on the host computer, a DHCP discovery to the DHCP service; receiving, by the DHCP client, a DHCP offer from the DHCP service; transmitting, by the DHCP client, a DHCP request to the DHCP service; and receiving, by the DHCP client, a DHCP acknowledgment and the IP address from the DHCP services.

6. The computer-implemented method of claim 1, wherein determining the IP address assigned to the port of the virtualized compute instance has been misused, expired or spoofed comprises determining one or more of: whether the virtualized compute instance started using an IP address that is different than the IP address assigned to the port of the virtualized compute instance by a DHCP service, whether a lease on the IP address assigned to the port of the virtualized compute instance by the DHCP service has expired, or whether another virtualized compute instance started using the IP address assigned to the port of the virtualized compute instance by the DHCP service.

7. The computer-implemented method of claim 1, further comprising transmitting, to the port manager, a SpoofGuard configured with the IP address assigned to the port of the virtualized compute instance, the transmitting causing the port manager to install and configure the SpoofGuard to monitor whether the IP address assigned to the virtualized compute instance is misused or spoofed.

8. One or more non-transitory computer-readable storage media storing one or more computer instructions which, when executed by one or more processors, cause the one or more processors to perform:

detecting that a virtualized compute instance is instantiated on a host computer;

determining an IP address that has been assigned to a port of the virtualized compute instance;

transmitting a SpoofGaurd with the IP address to a port manager;

in response to the transmitting, receiving an indication that the IP address assigned to the port of the virtualized compute instance has been misused, expired or spoofed; and in response to determining that the IP address assigned to the port of the virtualized compute instance has been misused, expired or spoofed, transmitting, to the port manager, instructions to set a BLOCK-EXCEPT-DHCP status on the port assigned to the virtualized compute instance.

9. The one or more non-transitory computer-readable storage media of claim 8, wherein setting the BLOCK-EXCEPT-DHCP status on the port causes the port manager of the port to block any traffic to and from the port except DHCP-related traffic.

10. The one or more non-transitory computer-readable storage media of claim 8, wherein the one or more computer instructions further cause the one or more processors to perform the following: determining the IP address has been assigned to the port of the virtualized compute instance by a DHCP service.

11. The one or more non-transitory computer-readable storage media of claim 10, wherein determining, the IP address has been assigned to the port of the virtualized compute instance by the DHCP service includes receiving, from the DHCP service or a datapath process, an indication that the IP address has been assigned to the port of the virtualized compute instance by the DHCP service and the IP address that has been assigned.

12. The one or more non-transitory computer-readable storage media of claim 10, wherein the one or more computer instructions further cause the one or more processors to perform the following: transmitting, by a DHCP client executing on the host computer, a DHCP discovery to the DHCP service; receiving, by the DHCP client, a DHCP offer from the DHCP service; transmitting, by the DHCP client, a DHCP request to the DHCP service; and receiving, by the DHCP client, a DHCP acknowledgment and the IP address from the DHCP services.

13. The one or more non-transitory computer-readable storage media of claim 8, wherein determining the IP address assigned to the port of the virtualized compute instance has been misused, expired or spoofed comprises determining one or more of: whether the virtualized compute instance started using an IP address that is different than the IP address assigned to the port of the virtualized compute instance by a DHCP service, whether a lease on the IP address assigned to the port of the virtualized compute instance by the DHCP service has expired, or whether another virtualized compute instance started using the IP address assigned to the port of the virtualized compute instance by the DHCP service.

14. The one or more non-transitory computer-readable storage media of claim 8, wherein the one or more computer instructions further cause the one or more processors to perform the following: transmitting, to the port manager, a SpoofGuard configured with the IP address assigned to the port of the virtualized compute instance, the transmitting causing the port manager to install and configure the SpoofGuard to monitor whether the IP address assigned to the virtualized compute instance is misused or spoofed.

15. A network controller configured to implement mechanisms for DHCP-communications monitoring in software defined networks, the network controller comprising:

one or more processors; one or more memory units; and one or more non-transitory computer-readable storage media storing one or more computer instructions which, when executed by the one or more processors, cause the one or more processors to perform:

detecting that a virtualized compute instance is instantiated on a host computer;

determining an IP address that has been assigned to a port of the virtualized compute instance;

transmitting a SpoofGaurd with the IP address to a port manager;

in response to the transmitting, receiving an indication that the IP address assigned to the port of the virtualized compute instance has been misused, expired or spoofed; and in response to determining that the IP address assigned to the port of the virtualized compute instance has been misused, expired or spoofed, transmitting, to the port manager, instructions to set a BLOCK-EXCEPT-DHCP status on the port assigned to the virtualized compute instance.

16. The network controller of claim 15, storing additional instructions for setting the BLOCK-EXCEPT-DHCP status on the port by causing the port manager of the port to block any traffic to and from the port except DHCP-related traffic.

17. The network controller of claim 15, wherein the one or more computer instructions further cause the one or more processors to perform the following: determining the IP address has been assigned to the port of the virtualized compute instance by a DHCP service.

18. The network controller of claim 17, wherein determining, the IP address has been assigned to the port of the virtualized compute instance by the DHCP service includes receiving, from the DHCP service or a datapath process, an indication that the IP address has been assigned to the port of the virtualized compute instance by the DHCP service and the IP address that has been assigned.

19. The network controller of claim 17, wherein the one or more computer instructions further cause the one or more processors to perform the following: transmitting, by a DHCP client executing on the host computer, a DHCP discovery to the DHCP service; receiving, by the DHCP client, a DHCP offer from the DHCP service; transmitting, by the DHCP client, a DHCP request to the DHCP service; and receiving, by the DHCP client, a DHCP acknowledgment and the IP address from the DHCP services.

20. The network controller of claim 15, wherein determining the IP address assigned to the port of the virtualized compute instance has been misused, expired or spoofed comprises determining one or more of: whether the virtualized compute instance started using an IP address that is different than the IP address assigned to the port of the virtualized compute instance by a DHCP service, whether a lease on the IP address assigned to the port of the virtualized compute instance by the DHCP service has expired, or whether another virtualized compute instance started using the IP address assigned to the port of the virtualized compute instance by the DHCP service.

* * * * *